Figure 4:
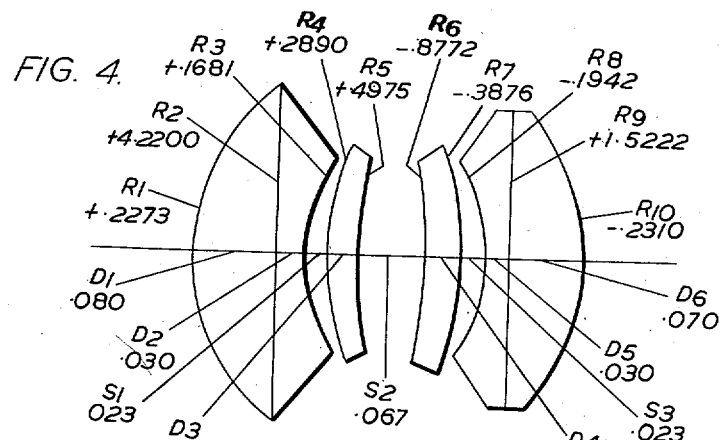

June 24, 1952     G. H. COOK     2,601,593
FOUR COMPONENT OPTICAL OBJECTIVE
Filed March 8, 1951     3 Sheets-Sheet 1
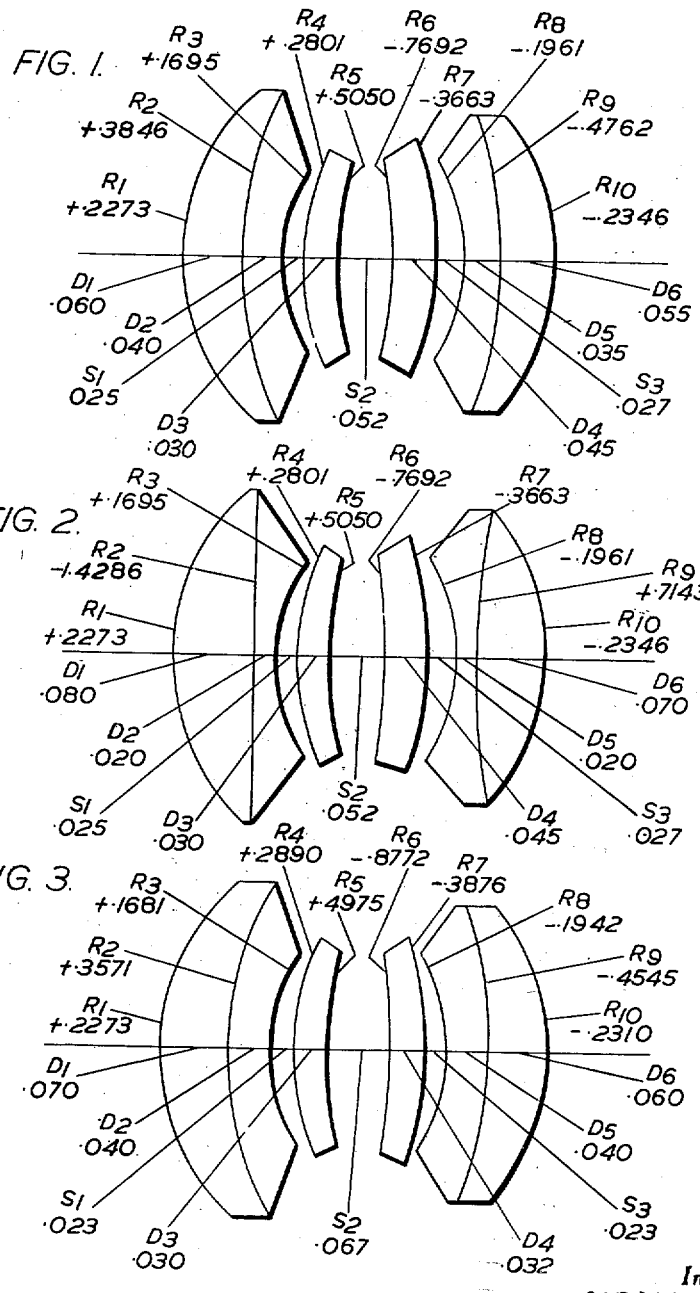
Inventor
GORDON H. COOK
By Emery, Holcombe a Blair
Attorney June 24, 1952  G. H. COOK  2,601,593
FOUR COMPONENT OPTICAL OBJECTIVE
Filed March 8, 1951  3 Sheets-Sheet 2

Inventor
GORDON H. COOK
By Emery, Holcombe & Blair
Attorney

June 24, 1952        G. H. COOK        2,601,593
FOUR COMPONENT OPTICAL OBJECTIVE
Filed March 8, 1951        3 Sheets-Sheet 3
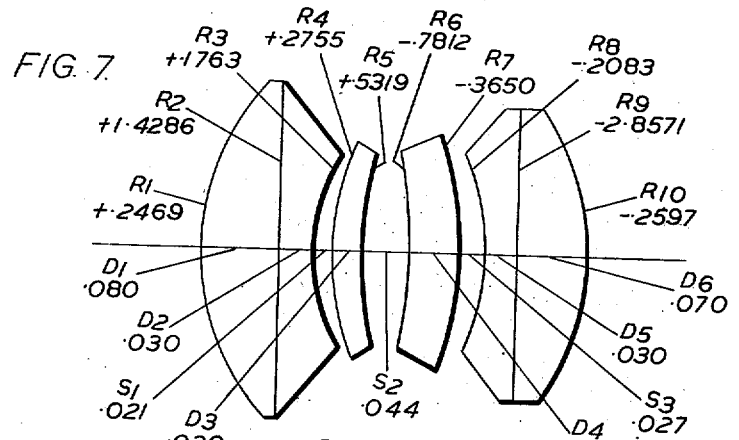
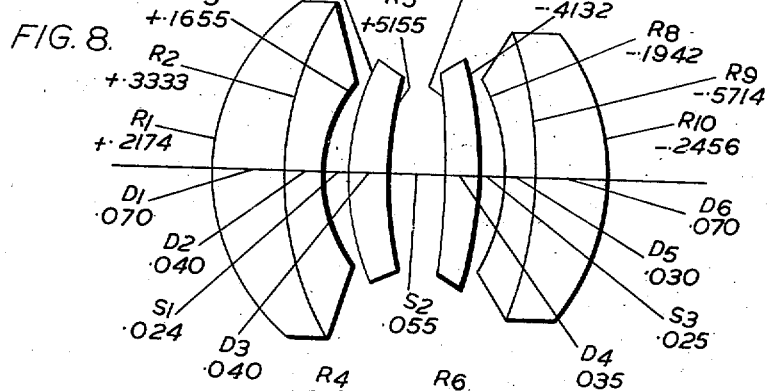
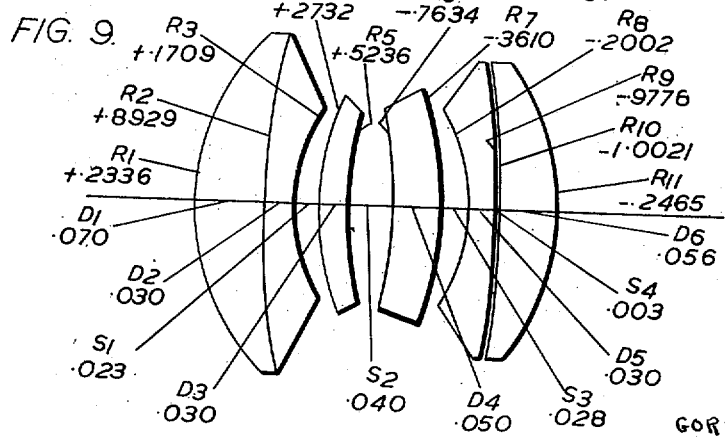
Inventor
GORDON H. COOK
By Emery, Holcombe & Blair
Attorney

UNITED STATES PATENT OFFICE 2,601,593

FOUR COMPONENT OPTICAL OBJECTIVE

Gordon Henry Cook, Leicester, England, assignor to Taylor, Taylor & Hobson Limited, Leicester, England, a British company Application March 8, 1951, Serial No. 214,508
In Great Britain February 15, 1951

19 Claims. (Cl. 88—57)

This invention relates to an optical objective, more especially for photographic purposes, corrected for spherical and chromatic aberrations, coma, astigmatism, field curvature and distortion, and comprising two simple convergent components located between two doublet divergent components each consisting of a convergent element and a divergent element, all four components being of meniscus form with their air-exposed surfaces concave towards a diaphragm between the two simple components, the divergent element in each compound component being on the side nearer to the diaphragm.

The invention has for its object to provide a well-corrected objective of this type having a high relative aperture and wide covering power and also having improved correction for zonal spherical aberration and oblique spherical aberration. The invention has the further advantage that it makes it possible to have diameters larger than are needed for the axial beam alone in order to avoid the vignetting which would otherwise be objectionable with the wide angular field covered.

In the objective according to the present invention, the arithmetic mean between the curvatures of the internal contacts in the doublet outer components (a curvature being reckoned for this purpose as positive when the internal contact is concave towards the diaphragm) is less than 3.5 times the equivalent power of the objective and is greater than $2(10x-1)/(10x+1)$ times such equivalent power, where $x$ is the positive value of the difference between the arithmetic mean of the mean refractive indices of the materials of the convergent elements of the doublet components and the arithmetic mean of the mean refractive indices of the materials of the divergent elements of such components.

The term "internal contact" is used herein, in order to avoid the ambiguity and confusion inherent in the use of the terms "internal contact surface" and "internal contact surfaces" more usually employed hitherto, and indicates the assemblage of two cooperating surfaces in a compound component, whether such surfaces are cemented together or are in the form of a "broken contact," that is when the two cooperating surfaces have slightly different curvatures, such difference being less than 0.2 times the equivalent power of the objective, whilst the axial separation (if any) of the two surfaces is less than .01 times the equivalent focal length of the objective. The radius of curvature of an internal contact is the actual radius of curvature of the surface in the case of a cemented contact or the harmonic mean between the radii of curvature of the two surfaces in the case of a broken contact.

The arithmetic mean between the axial thicknesses of the two doublet components preferably lies between .075 F and .15 F, where F is the equivalent focal length of the objective. The arithmetic mean between the positive values of the radii of curvature of the outer surfaces of the two simple inner components preferably lies between .22 F and .44 F. The arithmetic mean between the positive values of the radii of curvature of the inner air-exposed surfaces of the two doublet components preferably lies between .11 F and .25 F, and the arithmetic mean between the positive values of the radii of curvature of the outer air-exposed surfaces of the two doublet components preferably lies between .17 F and .30 F.

Since the expression $2(10x-1)/(10x+1)$, referred to above, can be negative, the invention does not preclude the possibility of having the internal contacts in the doublet components convex towards the diaphragm, but this is only permissible provided that the refractive index differences between the materials of the convergent and divergent elements of the doublet components are small. On the other hand, since $x$ is positive, such expression cannot exceed $+2$, and consequently, if the internal contacts are fairly strongly concave towards the diaphragm, there is wide freedom of choice of the indices.

In one group of practical embodiments of the invention, $x$ as above defined is less than .03, and the arithmetic mean between the mean refractive indices of the materials of the two simple inner components lies between 1.55 and 1.80. Such arithmetic mean preferably lies between 1.55 and 1.68, when the objective is to be corrected to cover a semi-angular field greater than 30 degrees.

It is not essential that the two halves of the objective should be symmetrical or nearly so, and the mean refractive index of the material of the convergent element in one of the doublet components may be greater than that of the associated divergent element, whilst in the other doublet component the mean refractive index of the material of the divergent element is the greater. In such case, within this group, the arithmetic mean between the mean refractive indices of the materials of the two simple components preferably lies between $(y-.10)$ and $(y+.22)$, where $y$ is the arithmetic mean of the mean refractive indices of the materials of the four elements of the two doublet components. Such range is preferably narrowed to between $(y-.10)$ and $(y+.10)$, when the objective is to be corrected to cover a semi-angular field greater than 30 degrees.

In another group of practical embodiments of the invention, $x$ as above defined is greater than .03. Within this group there may be an ascending order of refractive indices away from the diaphragm, that is that in each half of the objective the mean refractive index of the material of the divergent element is less than that of the convergent element associated with it and greater than that of the simple inner component, or conversely there may be a descending order of refractive indices away from the diaphragm. For both these alternatives, in the case when the objective is to be corrected to cover a semi-angular field greater than 30 degrees, the arithmetic means between the positive values of the amounts by which the mean refractive indices of the materials of the two simple components differ from the mean refractive indices of the materials of the divergent elements of the associated doublet components is preferably greater than $4x/3$. The maximum limit for such arithmetic mean is determined primarily by the availability of material for the elements.

Figure 5:
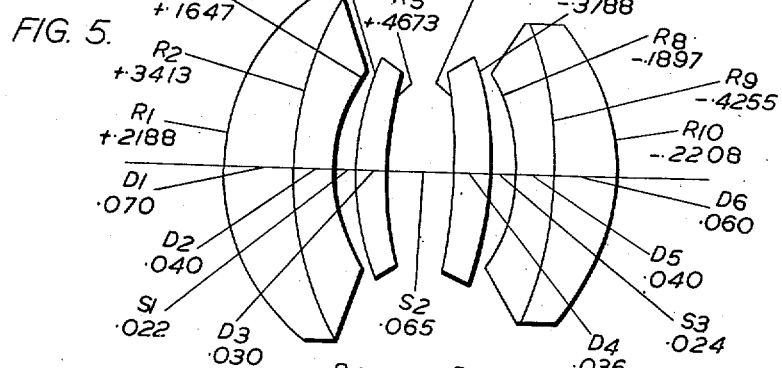
Figure 6:
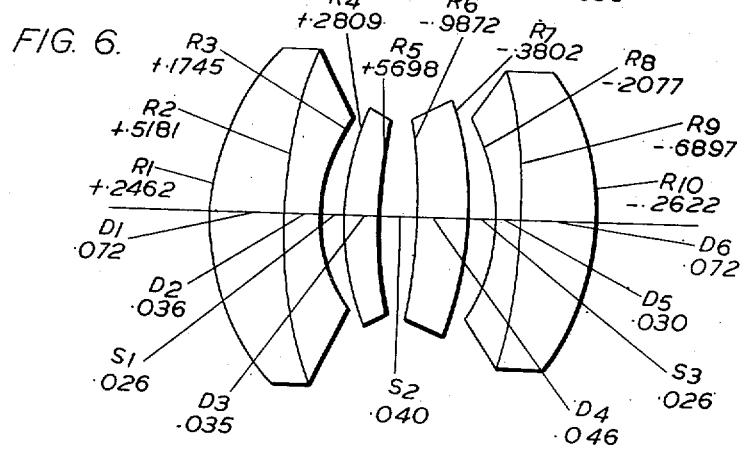

Figures 1–9 of the accompanying drawings respectively illustrate nine convenient practical examples of objective according to the invention and numerical data for these examples are given in the following tables, in which $R_1 R_2 \ldots$ represent the radii of curvature of the individual surfaces of the objective, the positive sign indicating that the surface is convex to the front and the negative sign that it is concave thereto (the term "front" being used to indicate the side of the larger conjugate, in accordance with the usual convention), $D_1 D_2 \ldots$ represent the axial thicknesses of the various elements, and $S_1 S_2 \ldots$ represent the axial air separations between the components. The tables also give the mean refractive indices $n_D$ for the D-line and the Abbé V numbers of the materials of the various elements.

*Example I*

| Equivalent focal length 1.000. Relative Aperture F/4 | | | |
|---|---|---|---|
| Radius | Thickness or Air Separation | Refractive Index $n_D$ | Abbé V number |
| $R_1 = +.2273$ | $D_1 = .060$ | 1.700 | 41.2 |
| $R_2 = +.3846$ | $D_2 = .040$ | 1.700 | 30.3 |
| $R_3 = +.1695$ | $S_1 = .025$ | | |
| $R_4 = +.2801$ | $D_3 = .030$ | 1.610 | 57.3 |
| $R_5 = +.5050$ | $S_2 = .052$ | | |
| $R_6 = -.7692$ | $D_4 = .045$ | 1.610 | 57.3 |
| $R_7 = -.3663$ | $S_3 = .027$ | | |
| $R_8 = -.1961$ | $D_5 = .035$ | 1.700 | 30.3 |
| $R_9 = -.4762$ | $D_6 = .055$ | 1.700 | 41.2 |
| $R_{10} = -.2346$ | | | |

*Example II*

| Equivalent focal length 1.000. Relative Aperture F/4 | | | |
|---|---|---|---|
| Radius | Thickness or Air Separation | Refractive Index $n_D$ | Abbé V number |
| $R_1 = +.2273$ | $D_1 = .080$ | 1.700 | 53.0 |
| $R_2 = -1.4286$ | $D_2 = .020$ | 1.700 | 41.2 |
| $R_3 = +.1695$ | $S_1 = .025$ | | |
| $R_4 = +.2801$ | $D_3 = .030$ | 1.610 | 37.5 |
| $R_5 = +.5050$ | $S_2 = .052$ | | |
| $R_6 = -.7692$ | $D_4 = .045$ | 1.610 | 37.5 |
| $R_7 = -.3663$ | $S_3 = .027$ | | |
| $R_8 = -.1961$ | $D_5 = .020$ | 1.700 | 41.2 |
| $R_9 = +.7143$ | $D_6 = .070$ | 1.700 | 53.0 |
| $R_{10} = -.2346$ | | | |

*Example III*

| Equivalent focal length 1.000. Relative Aperture F/4 | | | |
|---|---|---|---|
| Radius | Thickness or Air Separation | Refractive Index $n_D$ | Abbé V number |
| $R_1 = +.2273$ | $D_1 = .070$ | 1.623 | 56.2 |
| $R_2 = +.3571$ | $D_2 = .040$ | 1.623 | 36.0 |
| $R_3 = +.1681$ | $S_1 = .023$ | | |
| $R_4 = +.2890$ | $D_3 = .030$ | 1.623 | 56.2 |
| $R_5 = +.4975$ | $S_2 = .067$ | | |
| $R_6 = -.8772$ | $D_4 = .032$ | 1.623 | 56.2 |
| $R_7 = -.3876$ | $S_3 = .023$ | | |
| $R_8 = -.1942$ | $D_5 = .040$ | 1.623 | 36.0 |
| $R_9 = -.4545$ | $D_6 = .060$ | 1.623 | 56.2 |
| $R_{10} = -.2310$ | | | |

*Example IV*

| Equivalent focal length 1.000. Relative Aperture F/4 | | | |
|---|---|---|---|
| Radius | Thickness or Air Separation | Refractive Index $n_D$ | Abbé V number |
| $R_1 = +.2273$ | $D_1 = .080$ | 1.623 | 56.2 |
| $R_2 = +4.2200$ | $D_2 = .030$ | 1.623 | 39.6 |
| $R_3 = +.1681$ | $S_1 = .023$ | | |
| $R_4 = +.2890$ | $D_3 = .030$ | 1.623 | 36.0 |
| $R_5 = +.4975$ | $S_2 = .067$ | | |
| $R_6 = -.8772$ | $D_4 = .032$ | 1.623 | 36.0 |
| $R_7 = -.3876$ | $S_3 = .023$ | | |
| $R_8 = -.1942$ | $D_5 = .030$ | 1.623 | 39.6 |
| $R_9 = +1.5222$ | $D_6 = .070$ | 1.623 | 56.2 |
| $R_{10} = -.2310$ | | | |

In the above four examples, all of which belong to the first of the groups above mentioned, wherein the materials of the convergent and divergent elements of the two doublet components have substantially the same mean refractive index so that $x$ as above defined is zero, the diaphragm is located approximately midway between the surfaces $R_5$ and $R_6$, and the objective is in each case corrected for a wide angular field of semi-angle 36 degrees.

Since $x$ is zero, the expression $2(10x-1)/(10x+1)$ is $-2$ in each case. This permits, according to the invention, a wide choice in the curvatures of the internal contacts $R_2$ and $R_9$. There is also available a wide choice of Abbé V numbers for the materials of all the elements. This considerably simplifies the problem of finding suitable materials for the elements and also greatly facilitates correction of the higher order chromatic errors. Thus, in Example I the internal contacts $R_2$ and $R_9$ are both fairly strongly concave towards the diaphragm, whilst Example II is a modification of Example I in which the internal contacts are slightly convex towards the diaphragm and in which a completely different series of Abbé V numbers is used. Example III is another example in which the internal contacts are fairly strongly concave towards the diaphragm but in which substantially the same mean refractive index is used for the materials of all the elements, whilst Example IV differs from Example III in much the same way as Example II differs from Example I, the internal contacts in this case being nearly flat, one slightly convex and the other slightly concave towards the diaphragm.

In Example I, the curvatures of the internal contacts $R_2$ and $R_9$ are respectively $+2.6$ and $+2.1$ times the equivalent power of the objective, the positive sign in this case indicating that the surfaces are concave towards the diaphragm, and the arithmetic mean between them is thus $+2.35$ times such power. In Example II, however, the corresponding figures for the two curvatures are $-.70$ and $-1.40$ giving an arithmetic mean $-1.05$.

In both these examples, the arithmetic mean between the axial thicknesses of the two doublet components is $.095$ F; the arithmetic mean between the positive values of the radii of curvature of the outer surfaces $R_4$ and $R_7$ of the two simple inner components is $.3232$ F; the arithmetic mean between the positive values of the radii of curvature of the inner surfaces $R_3$ and $R_8$ of the two doublet components is $.1828$ F; and the arithmetic mean between the positive values of the radii of curvature of the outer surfaces $R_1$ and $R_{10}$ of the two doublet components is $.2310$ F.

In Example III the curvatures of the internal contacts $R_2$ and $R_9$ are $+2.8$ and $+2.2$ respectively times the equivalent power of the objective and their arithmetic mean is thus $+2.5$ times such power. In Example IV the corresponding figures are $+.24$ and $-.66$, giving an arithmetic mean $-.21$.

In Examples III and IV, the arithmetic mean between the axial thicknesses of the two doublet components is $.105$ F; the arithmetic mean between the positive values of the radii of curvature of the surfaces $R_4$ and $R_7$ is $.3383$ F; the arithmetic mean between the positive values of the radii of curvature of the surfaces $R_3$ and $R_8$ is $.1811$ F, and the arithmetic mean between the positive values of the radii of curvature of the surfaces $R_1$ and $R_{10}$ is $.2291$ F.

The next three examples differ from the first four, in that they belong to the second group above mentioned, wherein the quantity $x$ is greater than $.03$, so that a wide choice of refractive indices is available but less variation in the curvatures of the internal contacts. The three examples are designed to differ considerably from one another in order to indicate such range of variation.

*Example V*

| Equivalent focal length 1.000. Relative Aperture F/4 | | | |
|---|---|---|---|
| Radius | Thickness or Air Separation | Refractive Index $n_D$ | Abbé V number |
| $R_1 = +.2188$ | $D_1 = .070$ | 1.5722 | 57.7 |
| $R_2 = +.3413$ | $D_2 = .040$ | 1.6205 | 36.2 |
| $R_3 = +.1647$ | $S_1 = .022$ | | |
| $R_4 = +.2833$ | $D_3 = .030$ | 1.6910 | 54.8 |
| $R_5 = +.4673$ | $S_2 = .065$ | | |
| $R_6 = -.7874$ | $D_4 = .036$ | 1.6910 | 54.8 |
| $R_7 = -.3788$ | $S_3 = .024$ | | |
| $R_8 = -.1897$ | $D_5 = .040$ | 1.6205 | 36.2 |
| $R_9 = -.4255$ | $D_6 = .060$ | 1.5722 | 57.7 |
| $R_{10} = -.2208$ | | | |

*Example VI*

| Equivalent focal length 1.000. Relative Aperture F/4 | | | |
|---|---|---|---|
| Radius | Thickness or Air Separation | Refractive Index $n_D$ | Abbé V number |
| $R_1 = +.2462$ | $D_1 = .072$ | 1.717 | 47.9 |
| $R_2 = +.5181$ | $D_2 = .036$ | 1.610 | 37.5 |
| $R_3 = +.1745$ | $S_1 = .026$ | | |
| $R_4 = +.2809$ | $D_3 = .035$ | 1.4339 | 95.4 |
| $R_5 = +.5608$ | $S_2 = .040$ | | |
| $R_6 = -.9872$ | $D_4 = .046$ | 1.4339 | 95.4 |
| $R_7 = -.3802$ | $S_3 = .026$ | | |
| $R_8 = -.2077$ | $D_5 = .030$ | 1.610 | 37.5 |
| $R_9 = -.6897$ | $D_6 = .072$ | 1.717 | 47.9 |
| $R_{10} = -.2622$ | | | |

*Example VII*

| Equivalent focal length 1.000. Relative Aperture F/4 | | | |
|---|---|---|---|
| Radius | Thickness or Air Separation | Refractive Index $n_D$ | Abbé V number |
| $R_1 = +.2469$ | $D_1 = .080$ | 1.700 | 41.2 |
| $R_2 = +1.4286$ | $D_2 = .030$ | 1.648 | 33.8 |
| $R_3 = +.1763$ | $S_1 = .021$ | | |
| $R_4 = +.2755$ | $D_3 = .030$ | 1.510 | 64.4 |
| $R_5 = +.5319$ | $S_2 = .044$ | | |
| $R_6 = -.7812$ | $D_4 = .050$ | 1.510 | 64.4 |
| $R_7 = -.3650$ | $S_3 = .027$ | | |
| $R_8 = -.2083$ | $D_5 = .030$ | 1.648 | 33.8 |
| $R_9 = -2.8571$ | $D_6 = .070$ | 1.700 | 41.2 |
| $R_{10} = -.2597$ | | | |

These three examples are all corrected to cover a wide angular field of semi-angle 36 degrees, and in each case the diaphragm is approximately midway between the surfaces $R_5$ and $R_6$.

In Example V, the quantity $x$ as above defined is .0483 and the expression $2(10x-1)/(10x+1)$ works out as $-.70$. The corresponding figures for Example VI are .106 and $+.06$ whilst those for Example VII are .052 and $-.63$. In Example V the curvatures of the internal contacts $R_2$ and $R_9$ are respectively $+2.93$ and $+2.35$ times the equivalent power of the objective, the surfaces both being concave to the diaphragm, and their arithmetic mean is $+2.64$ times such power. The corresponding figures for the two curvatures in Example VI are $+1.93$ and $+1.45$ and for the arithmetic mean $+1.69$, whilst for Example VII the figures for the two curvatures are $+.70$ and $+.35$ giving a mean $+.52$.

The arithmetic mean between the axial thicknesses of the two doublet components is .105 F in all three examples. The arithmetic mean between the positive values of the radii of curvature of the surfaces $R_4$ and $R_7$ is .3310 F in Example V, .3305 F in Example VI and .3202 F in Example VII. The arithmetic mean between the positive values of the radii of curvature of the surfaces $R_3$ and $R_8$ is .1767 F in Example V, .1911 F in Example VI, and .1923 F in Example VII. The arithmetic mean between the positive values of the radii of curvature of the surfaces $R_1$ and $R_{10}$ is .2198 F in Example V, .2542 F in Example VI and .2533 F in Example VII.

In Example V the mean refractive indices are arranged in descending order away from the diaphragm, whilst in Examples VI and VII they are arranged in ascending order away from the diaphragm. The arithmetic mean between the positive values of the amounts by which the mean refractive indices of the materials of the simple components differ from those of the adjacent divergent elements is .0705 in Example V, .176 in Example VI and .133 in Example VII.

It will be noticed that in Examples V and VI the internal contacts are fairly strongly concave towards the diaphragm, but Example VII is an example in which these internal contacts are only weakly concave towards the diaphragm. Example VI employs crystalline calcium fluoride as the material for the simple components.

In all the foregoing examples, the two halves of the objective are nearly symmetrical with one another, but this is not essential to the invention, and various combinations of one half of one example with one half of another example, with relatively slight consequential alterations of some of the dimensions, are possible within the scope of the invention. Again, it is sometimes possible to modify such variants further by interchanging the refractive indices of the materials of two corresponding elements (one in each half).

Thus, the following table gives a variant in which the front half closely resembles that of Example V and the rear half that of Example VII, with the further modification of inverting the refractive indices of the materials of the two simple components.

Example VIII

| Equivalent focal length 1.000. Relative Aperture F/4 | | | |
|---|---|---|---|
| Radius | Thickness or Air Separation | Refractive Index $n_D$ | Abbé V number |
| $R_1=+.2174$ | $D_1=.070$ | 1.5694 | 55.8 |
| $R_2=+.3333$ | $D_2=.040$ | 1.6132 | 36.9 |
| $R_3=+.1655$ | $S_1=.024$ | | |
| $R_4=+.2591$ | $D_3=.040$ | 1.5076 | 61.2 |
| $R_5=+.5155$ | $S_2=.055$ | | |
| $R_6=-.8197$ | $D_4=.035$ | 1.6910 | 54.8 |
| $R_7=-.4132$ | $S_3=.025$ | | |
| $R_8=-.1942$ | $D_5=.030$ | 1.6535 | 33.5 |
| $R_9=-.5714$ | $D_6=.070$ | 1.7170 | 47.9 |
| $R_{10}=-.2456$ | | | |

This example is corrected to cover a semi-angular field of 36 degrees, and its diaphragm is again approximately midway between the surfaces $R_5$ and $R_6$.

In this example, $x$ as above defined has a value .01, and the expression $2(10x-1)/(10x+1)$ becomes $-1.64$. It is interesting to note that although this example is derived from two examples both in the second group, the example itself belongs to the first group. The curvatures of the internal contacts $R_2$ and $R_9$ are respectively $+3.00$ and $+1.75$ times the equivalent power of the objective, giving an arithmetic mean $+2.37$ times such power.

The arithmetic mean of the mean refractive indices of the materials of the four elements of the doublets (the quantity $y$ above mentioned) is 1.6383, and the arithmetic mean between the mean refractive indices of the materials of the two simple components is 1.5993.

The arithmetic mean between the axial thicknesses of the two doublet components is 105 F. The arithmetic mean between the positive values of the radii of curvature of the surfaces $R_4$ and $R_7$ is .3361 F. The arithmetic mean between the positive values of the radii of curvature of the surfaces $R_3$ and $R_8$ is .1799 F. The arithmetic mean between the positive values of the radii of curvature of the surfaces $R_1$ and $R_{10}$ is .2315 F.

It will be appreciated that Example VIII is only one example of a large number of possible variants which are asymmetrical hybrids between two approximately symmetrical examples, and it is quite practical to build up such a hybrid from two examples one in each of the two groups above mentioned.

In all the foregoing examples, the internal contacts are cemented, but as has already been mentioned, this is not essential to the invention, and either or both of the internal contacts may be in the form of broken contacts. As one example of this, the following table shows a variant of Example VII, in which the internal contact in the rear doublet component is a broken contact, that in the front doublet component being cemented.

Example IX

| Radius | Thickness or Air Separation | Refractive Index $n_D$ | Abbé V number |
|---|---|---|---|
| Equivalent focal length 1.000. Relative Aperture F/4 ||||
| $R_1 = +.2336$ | $D_1 = .070$ | 1.7000 | 41.2 |
| $R_2 = +.8929$ | $D_2 = .030$ | 1.6535 | 33.5 |
| $R_3 = +.1709$ | $S_1 = .023$ | | |
| $R_4 = +.2732$ | $D_3 = .030$ | 1.5100 | 64.4 |
| $R_5 = +.5236$ | $S_2 = .040$ | | |
| $R_6 = -.7634$ | $D_4 = .050$ | 1.5100 | 64.4 |
| $R_7 = -.3610$ | $S_3 = .028$ | | |
| $R_8 = -.2002$ | $D_5 = .030$ | 1.6535 | 33.5 |
| $R_9 = -.9778$ | $S_4 = .003$ | | |
| $R_{10} = -1.0021$ | $D_6 = .056$ | 1.700 | 41.2 |
| $R_{11} = -.2465$ | | | |

The diaphragm in this example is again approximately midway between the surfaces $R_5$ and $R_6$, and the objective is corrected to cover a semi-angular field of 36 degrees.

In this example, $x$ has the value .0465 and the expression $2(10x-1)/(10x+1)$ becomes $-.73$. The curvature of the cemented contact $R_2$ is $+1.12$ times the equivalent power of the objective, whilst that of the broken contact $R_9 R_{10}$ is the mean of the two individual curvatures $+1.01$ times such power, so that the arithmetic mean between them is $+1.07$ times such power.

The arithmetic mean between the axial thicknesses of the two doublet components is .095 F. The arithmetic means between the positive values of the radii of curvature of the surfaces $R_4$ and $R_7$, the surfaces $R_3$ and $R_8$, and the surfaces $R_1$ and $R_{11}$ are respectively .3171 F, .1855 F and .2400 F.

The mean refractive indices in this example are arranged in ascending order away from the diaphragm, and the mean refractive index of the material of the divergent element of the compound component exceeds that for the simple component by .1435 in each half.

In all the examples the improvements according to the invention make it possible to have diameters for the various elements larger than is required for the axial beam alone, and such larger diameters are very valuable in facilitating correction for oblique aberrations and contribute towards the wide angular field which can be covered by objectives according to the invention. Thus the effective diameters of the individual surfaces in all the examples may conveniently be .34 F for the surfaces $R_1$ and $R_2$, .2 F for the chamfers of the surfaces $R_3$ $R_5$ $R_6$ $R_8$, and .3 F for the surfaces $R_9$ and $R_{10}$ (or $R_9$ $R_{10}$ and $R_{11}$ in Example IX).

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

What I claim as my invention and desire to secure by Letters Patent is:

1. An optical objective, corrected for spherical and chromatic aberrations, coma, astigmatism, field curvature and distortion, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraically less than $+3.5/F$ where F is the equivalent focal length of the objective and greater than $2(10x-1)/(10x+1)F$, where $x$ is the positive value of the difference between the arithmetic mean of the mean refractive indices of the materials of the convergent elements of the two doublet components and the arithmetic mean of the mean refractive indices of the materials of the two divergent elements.

2. An optical objective as claimed in claim 1, in which the arithmetic mean of the axial thicknesses of the two doublet components lies between .075 F and .15 F.

3. An optical objective as claimed in claim 2, in which the arithmetic mean of the positive values of the radii of curvature of the outer surfaces of the simple inner components lies between .22 F and .44 F.

4. An optical objective as claimed in claim 3, in which the arithmetic mean of the positive values of the radii of curvature of the innermost surfaces of the doublet components lies between .11 F and .25 F, and that of the outermost surfaces of such components between .17 F and .30 F.

5. An optical objective as claimed in claim 1, in which the arithmetic mean of the positive values of the radii of curvature of the outer surfaces of the simple inner components lies between .22 F and .44 F.

6. An optical objective as claimed in claim 1, in which the arithmetic mean of the positive values of the radii of curvature of the innermost surfaces of the doublet components lies between .11 F and .25 F.

7. An optical objective as claimed in claim 1, in which the arithmetic mean of the positive values of the radii of curvature of the outermost surfaces of the doublet components lies between .17 F and .30 F.

8. An optical objective, corrected for spherical and chromatic aberrations, coma, astigmatism, field curvature and distortion, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraically less than $+3.5/F$ where F is the equivalent focal length of the objective and greater than $2(10x-1)/(10x+1)F$, where $x$ is the positive value of the difference between the arithmetic mean of the mean refractive indices of the materials of the convergent elements of the two doublet components and the arithmetic mean of the mean refractive indices of the materials of the two divergent elements, such difference $x$ being less than .03 while the arithmetic mean of the mean refractive indices of the materials of the two simple components lies between 1.55 and 1.80.

9. An optical objective as claimed in claim 8, corrected to cover a semi-angular field greater than 30 degrees, in which the arithmetic mean of the mean refractive indices of the materials of the two simple components lies between 1.55 and 1.68, and in which the arithmetic mean of the axial thicknesses of the two doublet components lies between .075 F and .15 F.

10. An optical objective as claimed in claim 8, in which the arithmetic mean of the positive values of the radii of curvature of the outer surfaces of the simple inner components lies between .22 F and .44 F.

11. An optical objective as claimed in claim 8, in which the arithmetic mean of the positive values of the radii of curvature of the innermost surfaces of the doublet components lies between .11 F and .25 F, and that of the outermost surfaces of such components between .17 F and .30 F.

12. An optical objective, corrected for spherical and chromatic aberrations, coma, astigmatism, field curvature and distortion, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraically less than $+3.5/F$ where F is the equivalent focal length of the objective and greater than $2(10x-1)/(10x+1)F$, where $x$ is the positive value of the difference between the arithmetic mean of the mean refractive indices of the materials of the convergent elements of the two doublet components and the arithmetic mean of the mean refractive indices of the materials of the two divergent elements, such difference $x$ being greater than .03 while in each half of the objective the mean refractive index of the material of the simple component exceeds that of the divergent element of the doublet component and the arithmetic mean of such excesses in the two halves is greater than $4x/3$.

13. An optical objective as claimed in claim 12, in which the arithmetic mean of the axial thicknesses of the two doublet components lies between .075 F and .15 F.

14. An optical objective as claimed in claim 12, in which the arithmetic mean of the positive values of the radii of curvature of the outer surfaces of the simple inner components lies between .22 F and .44 F.

15. An optical objective as claimed in claim 12, in which the arithmetic mean of the positive values of the radii of curvature of the innermost surfaces of the doublet components lies between .11 F and .25 F, and that of the outermost surfaces of such components between .17 F and .30 F.

16. An optical objective, corrected for spherical and chromatic aberrations, coma, astigmatism, field curvature and distortion, to cover a semi-angular field greater than 30 degrees, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraically less than $+3.5/F$ where F is the equivalent focal length of the objective and greater than $2(10x-1)/(10x+1)F$, where $x$ is the positive value of the difference between the arithmetic mean of the mean refractive indices of the materials of the convergent elements of the two doublet components and the arithmetic means of the mean refractive indices of the materials of the two divergent elements, such difference $x$ being greater than .03 while in each half of the objective the mean refractive index of the material of the divergent element of the doublet component exceeds that of the simple component and the arithmetic mean of such excesses in the two halves is greater than $4x/3$.

17. An optical objective as claimed in claim 16, in which the arithmetic mean of the axial thicknesses of the two doublet components lies between .075 F and .15 F.

18. An optical objective as claimed in claim 16, in which the arithmetic mean of the positive values of the radii of curvature of the outer surfaces of the simple inner components lies between .22 F and .44 F.

19. An optical objective as claimed in claim 16, in which the arithmetic mean of the positive values of the radii of curvature of the innermost surfaces of the doublet components lies between .11 F and .25 F, and that of the outermost surfaces of such components between .17 F and .30 F.

GORDON HENRY COOK.

REFERENCES CITED

The following references are of record in the file of this patent:

UNITED STATES PATENTS

| Number | Name | Date |
| --- | --- | --- |
| 1,792,917 | Merte | Feb. 17, 1931 |

FOREIGN PATENTS

| Number | Country | Date |
| --- | --- | --- |
| 135,853 | Great Britain | Nov. 26, 1919 |
| 295,519 | Great Britain | Aug. 16, 1928 |
| 649,112 | Germany | Aug. 14, 1937 |
| 547,739 | Great Britain | Sept. 9, 1942 |
| 592,144 | Great Britain | Sept. 9, 1947 |